May 4, 1965  E. ASONS ETAL  3,181,417
METHOD OF TESTING WITH AN OPTICAL COMPARATOR
Filed June 23, 1961  3 Sheets-Sheet 1

INVENTORS
E. ASONS
W. E. HILLSMAN
BY
ATTORNEY

May 4, 1965   E. ASONS ETAL   3,181,417
METHOD OF TESTING WITH AN OPTICAL COMPARATOR
Filed June 23, 1961
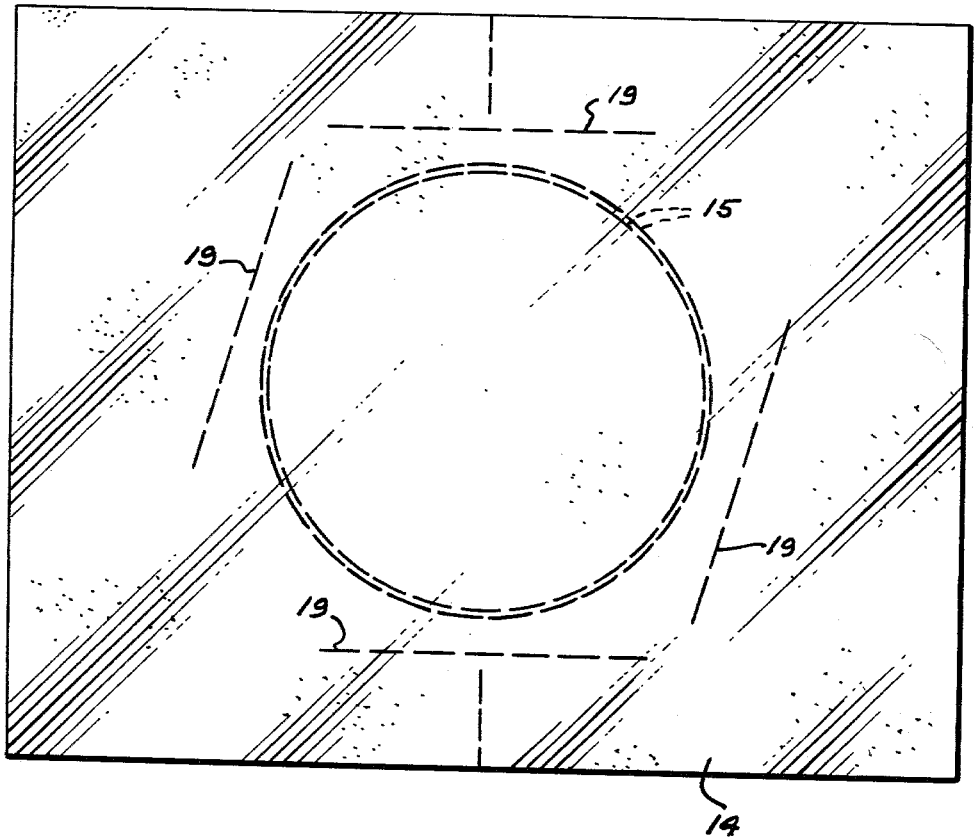
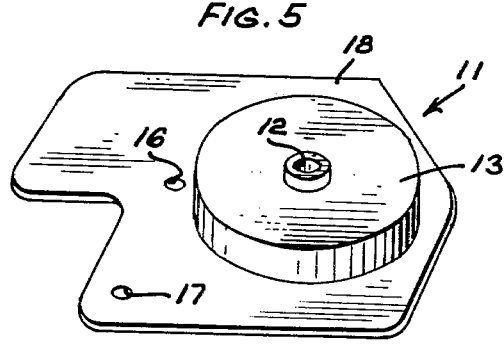
INVENTORS
E. ASONS
W. E. HILLSMAN
BY
ATTORNEY May 4, 1965 E. ASONS ETAL 3,181,417
METHOD OF TESTING WITH AN OPTICAL COMPARATOR
Filed June 23, 1961 3 Sheets-Sheet 3

INVENTORS
E. ASONS
W. E. HILLSMAN
BY
ATTORNEY

3,181,417
METHOD OF TESTING WITH AN OPTICAL COMPARATOR
Ernests Asons, Indianapolis, and Walter E. Hillsman, Greenfield, Ind., assignors to Western Electric Company Incorporated, New York, N.Y., a corporation of New York
Filed June 23, 1961, Ser. No. 119,115
3 Claims. (Cl. 88—24)

This invention relates to the testing of two dimensions of an article on an optical comparator, and more particularly to the testing of two dimensions which are of such relative magnitude that the larger dimension cannot be displayed on the screen of the optical comparator when the smaller dimension is magnified to the extent desired for proper testing. It is an object of the invention to provide an improved method of that character.

Optical comparators are in common use for testing dimensions of an article by projecting an image or silhouette of the article on a screen which has a pattern thereon with which the image may be compared. Commonly, the projected image is many times the size of the original article such that the comparator is very sensitive to deviations of an article from the prescribed dimensions.

It is occasionally desired that two dimensions of the article be tested. Where one of these dimensions is substantially larger than the other, both ends of the larger dimension cannot be displayed on the screen of the optical comparator if the magnification employed is sufficiently great that the smaller dimension can be compared accurately with the pattern on the screen. This can be done in accordance with the present invention where the two dimensions are related, i.e. one end of the larger dimension is at least closely adjacent the smaller dimension.

It is another object of the invention to provide an improved method of testing two related dimensions of an article of widely differing magnitudes on an optical comparator without altering magnification of the optical comparator.

It is still another object of the invention to provide an improved method of testing two related dimensions of an article of widely differing magnitudes on an optical comparator wherein the testing of one dimension is in no way affected by the testing of the other dimension.

It is a further object of the invention to provide an improved method of testing two related dimensions of an article of widely differing magnitudes on an optical comparator with only a single setting of the apparatus for each article.

It is a still further object of the invention to provide an improved method of testing two related dimensions of an article of widely differing magnitudes on an optical comparator having various of the characteristics referred to above while being inherently accurate, reliable and easy to employ.

In accordance with the present invention, the article to be tested is arranged on a fixture with one end of the larger dimension at a predetermined position with respect to a distinguishable point on the fixture, the latter point being closely adjacent the smaller dimension. The fixture is then moved with respect to the screen of the optical comparator such that the smaller dimension may be tested. More particularly, the fixture is moved to determine whether the smaller dimension may be brought within prescribed pattern lines on the screen. Simultaneously or subsequently, and with or without removal of the article from the fixture, but in any event without subsequent movement of the fixture, the above-referred to distinguishable point on the fixture is tested to determine whether it falls within prescribed pattern lines on the screen. As will become more apparent upon reading the detailed description below, the latter test determines acceptability of the larger dimension which is to be tested.

This invention, together with further objects and advantages thereof, will best be understood by reference to the following description taken in connection with the accompanying drawings, in which FIG. 1 is a front elevational view of a fixture supporting an article to be tested in accordance with the method of the present invention;

FIG. 4 is an end view of the lower one of the two spring-biased pins shown in FIG. 3;

FIG. 5 is a perspective view of the article being tested;

FIG. 6 is a suitable pattern for the optical comparator screen for use with the apparatus of FIGS. 1–4 in testing the article of FIG. 5;

Figure 1:
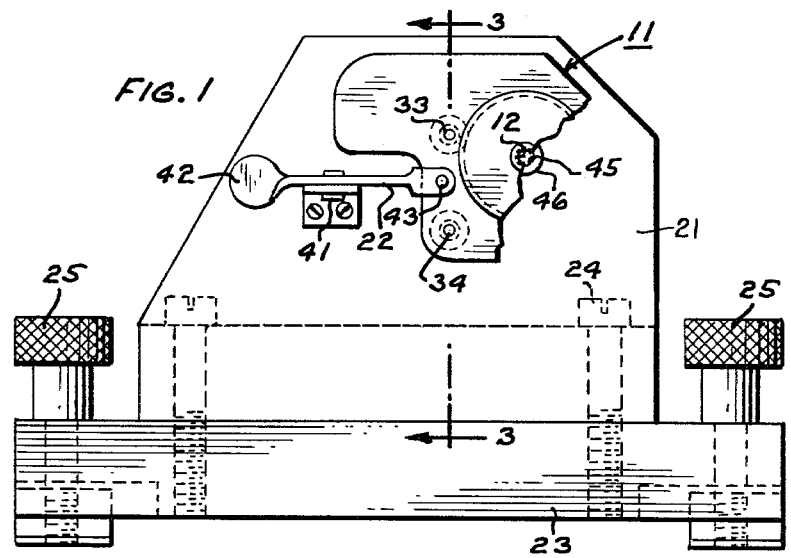

The apparatus of FIGS. 1–4 and 6 is arranged to test certain dimensions of an article 11, best seen in FIG. 5. The article has an opening 12 in a drum-like portion 13 thereof, which opening must be of a closely controlled diameter and whose periphery must define a nearly perfect circle. In order that this dimension of the article 11 may be tested conveniently, it is arranged on an optical comparator such that an image of the opening 12 is cast upon a screen 14 shown in FIG. 6. If the image or silhouette of the opening 12 can be made to fall within the concentric circles 15 of the screen pattern, the diameter and roundness of the opening are known to meet prescribed requirements. It will be noted in view of the above that where the term "dimension" is employed herein, it is intended that it be interpreted broadly to include either a single linear dimension or a general shape, or any combination thereof.

The article 11 also has openings 16 and 17 in a plate-like portion 18 thereof. It is desired that the distance from the center of the opening 12 to the center of the opening 16 be of a predetermined value, and that this dimension also be tested on the optical comparator. It will be apparent that if the image of the opening 12 is magnified to correspond in size to the concentric circles 15, the image of the opening 16 will be located far beyond the extremities of the screen.

If only the larger dimension, namely, the distance between the openings 12 and 16, were to be tested, it would still be desirable that high magnification be employed in order that the testing might be sensitive to small changes in this dimension. Where only the one larger dimension is to be tested, this problem can be solved by positioning the opening 16 in a prescribed location by virtue of engagement thereof with a suitable snug fitting pin on an article-supporting fixture or base of the optical comparator. The image of the aperture 12 would alone be projected on the optical comparator screen, and the distance between the opening 12 and the opening 16 could be checked by determining whether the image of the opening 12 falls within prescribed pattern lines such as the illustrated lines 19.

However, in the present case, both of these dimensions are to be tested, namely, the diameter and roundness of the opening 12, and the distance between the openings 12 and 16. It will be apparent that if the opening 16 is arranged in a predetermined position with respect to the screen 14, the distance between the openings 12 and 16 may be tested by determining whether the image of the opening 12 falls within the pattern lines 19, but that it would then be impractical to determine whether the opening 12 is of proper dimension since its image would in all probability be substantially displaced from the concentric circles 15. This is particularly true where the smaller dimension is required to fall within more critical limits than is the larger dimension. In accordance with the method comprising the present invention, these dimensions, or others like them, may be tested accurately and with a minimum number of operations.

Figure 3:
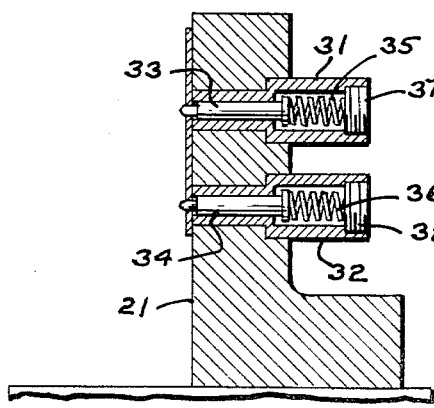
FIG. 3 is a partial cross-sectional view taken along the line 3—3 of FIG. 1.

In FIG. 1, the article 11 is shown mounted against one face of a vertical plate 21 by a spring-biased clamp 22. The plate 21 is L-shaped as best seen in FIG. 3, the horizontal leg thereof being secured to a base 23 as by screws 24. The base 23 is in turn secured, as by thumb screws 25, to a mounting (not shown) which is movable with respect to the screen 14 such that the article 11 to be tested may be moved readily both vertically and from left to right as viewed in FIG. 1. Preferably, the mounting is so devised as to permit momentary locking of the article in a selected position. Since such a mounting is common in the art, is simple in form, and does not of itself constitute a feature of the present invention, it is not shown in the drawings or further described herein.

Mounted in suitable openings in the plate 21 are sockets 31 and 32 slidably receiving pins 33 and 34, best seen in FIG. 3. The pins are biased toward the left by springs 35 and 36, the springs being retained in position by suitable threaded plugs 37 and 38. It will be noted that the pins 33 and 34 are headed at their righthand ends such that movement of the pins to the left is limited.

That portion of the pin 33 which extends beyond the lefthand surface of the wall 21, as viewed in FIG. 3, is essentially circular in cross section and is preferably tapered. The tip of the pin 33 is intended to be received within the opening 16 in the article 11 to position that opening at a predetermined location on the plate 21. The other pin 34 has an essentially diamond-shaped tip as illustrated in FIG. 4, it being intended that this tip be received by the opening 17 in the article 11. The longer dimension of the diamond-shaped tip of the pin 34 engages the horizontally opposed edges of the opening 17 as viewed in FIG. 1, such that the article 11 is properly oriented about the opening 16 and about the pin 33. The shorter dimension of the diamond-shaped tip of the pin 34 is vertically disposed in FIG. 1 whereby reasonable latitude is permitted in the distance between the openings 16 and 17.

The clamp 22 is pivoted at 41, has a finger plate 42, and a head 43 which is arranged to engage the article 11. Preferably, the clamp 22 is spring biased such that the head 43 is urged toward the plate 21.

It will be understood by those skilled in the art that the optical comparator includes a suitable source of a beam of parallel light rays directed perpendicular to the plate 21. An aperture 45 is provided in the plate 21 which is generally aligned with and somewhat larger than the opening 12 in the article to be tested. The aperture 45 serves at least two purposes, one of which is to permit the passage through the plate 21 of those rays which are passed by the opening 12 in the article 11. Those rays, and any others which may be passed, are magnified by the optical system of the optical comparator and are thrown on the screen 14 whereby an accurate comparison can be made between the projected image or silhouette of the article to be tested with the pattern which has been provided on the screen.

In order that the aperture 45 may be arranged as close as possible to the opening 12, a bushing 46 is arranged within an opening 47 in the plate 21, the forward end of the bushing (the lower end as viewed in FIG. 2) extending forward of the plate 21 and defining the aperture 45 in the forward extremity thereof.

The conventional and well known apparatus referred to above and shown in part in FIGS. 1–4 lends itself to the use of the novel method which constitutes the present invention and which is described in detail immediately below.

An article 11 which is to be tested is first placed against the plate 21 with the pin 33 firmly seated in the opening 16 and with the diamond-shaped pin 34 extending into the opening 17 to orient the article about the pin 33. The clamp 22, which was previously depressed to permit insertion of the article, is then released such that it holds the article against the plate 21.

With the light source of the optical comparator actuated, the image of the opening 12 is cast on the screen 14, and it will, in all probability, be slightly displaced from concentricity with the circles 15. The position of the fixture is then adjusted vertically and/or from left to right as viewed in FIG. 1, to bring the image of the opening 12 into concentricity with the circles 15. As previously indicated, this freedom of motion of the article-supporting fixture and the temporary locking of the fixture in selected position may be provided for through any suitable apparatus, and since such apparatus may be simple and obvious in form and does not of itself constitute a feature of the present invention, it is not shown in the drawings or described in detail herein.

With the image of the opening 12 concentric with the circles 15, it may be readily determined whether the image falls between the two circles. The diameter and the roundness or concentricity of the opening 12 may thereby be tested. Attention is again directed to the fact that these characteristics and/or others of the opening 12 are treated herein as constituting the smaller dimension of the article which is to be tested.

It will be apparent that this testing of the smaller dimension is entirely independent of the testing of the larger dimension, not yet discussed. More specifically, the smaller dimension of the article to be tested is moved into the desired position such that its projected image is brought into the desired relationship with the pattern provided on the screen.

In the particular form of the invention used in connection with FIGS. 1–6, the article 11 is next removed from the fixture without movement of the latter. The image of the aperture 45 is now projected on the screen 14, and the operator determines whether that image falls within the pattern lines 19 of the screen. Since the aperture 45 is of a prescribed diameter and is arranged at a predetermined distance from the pin 33, this determination serves as a test of the larger dimension, namely, the distance between the centers of the openings 12 and 16 of the article 11.

In order that this point may be fully understood, let it be assumed that the distance between the center of the pin 33 and the center of the aperture 45 is made to equal the desired distance between the openings 12 and 16 in the article 11 to a high degree of accuracy, and that the aperture 45 is of accurately controlled diameter. By virtue of the accurately controlled relationship between the opening 16 and the pin 33, the opening 12 and the aperture 45 may be brought to substantial concentricity, any deviation therefrom being a measure of the inaccuracy in the distance between the openings 12 and 16 in the particular article being tested. If, in the particular article being tested, the distance between the openings 12 and 16 is precisely that which is desired, the opening 12 will be concentric with the opening 45. If, in the particular article being tested, the distance between the openings 12 and 16 differs from the desired distance, the error will be equal to the difference in position of the opening 12 and the aperture 45.

Accordingly, it will be apparent that with the article 11 so positioned that the image of the opening 12 is concentric with the circles 15, the image of the aperture 45, after removal of the article 11, should also be concentric with the circles 15. However, since the aperture 45 must be somewhat larger than the opening 12, a different pattern is preferably employed to test the concentricity of the aperture 45 with the opening 12. More particularly, lines 19 are employed for this purpose.

The aperture 45 is made larger than the opening 12 in order that the full image of the opening 12 may be seen on the screen 14 even though the distance between the openings 12 and 16 of the article under test deviates slightly from the desired value. Since separate pattern lines 19 are employed for testing the adjusted position of the aperture 45 (separate of the circles 15), these lines 19 may be positioned not only to provide for the larger image of the aperture 45 but also for a different tolerance, where desired.

It should be further noted that the larger dimension being tested in accordance with the specific method described above includes not only the linear distance between the openings 12 and 16 but also the orientation of the opening 12 about the opening 16 with respect to the opening 17. If only the distance between the openings 12 and 16 were to be tested, only the substantially vertical ones of the lines 19 would be required. The use of the substantially horizontal ones of the lines 19 permits the testing of the orientation of the opening 12 about the opening 16 with respect to the opening 17.

An alternative form of the invention may be employed for testing two related dimensions of an article 51, one dimension again being several times as large as the other. The article 51 has a projection 52 whose configuration is to be tested, this configuration comprising the smaller dimension to be tested. It is also desired that the distance of the projection 52 from the righthand edge 53 be tested, this comprising the larger dimension to be tested.

Figure 2:
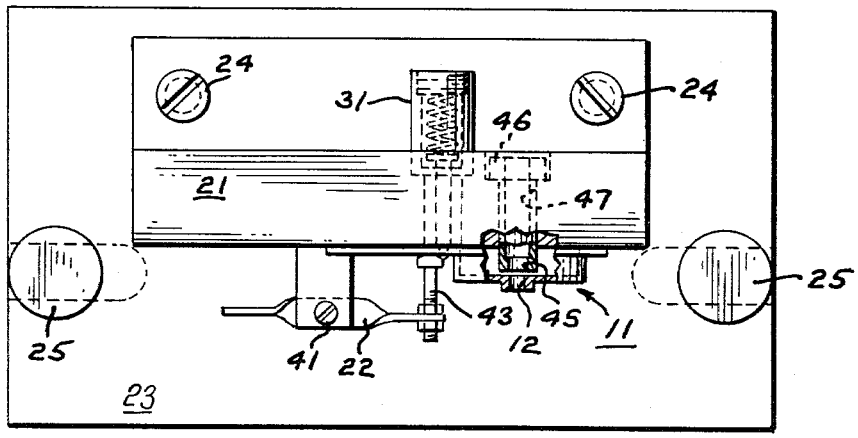
FIG. 2 is a top plan view of the same fixture.
Figure 7:
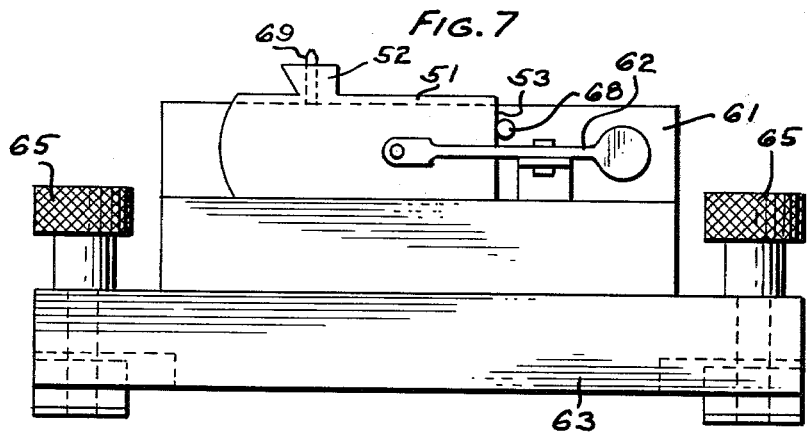
FIG. 7 is a front elevational view of another fixture and an article to be tested in accordance with the present invention.
Figure 8:
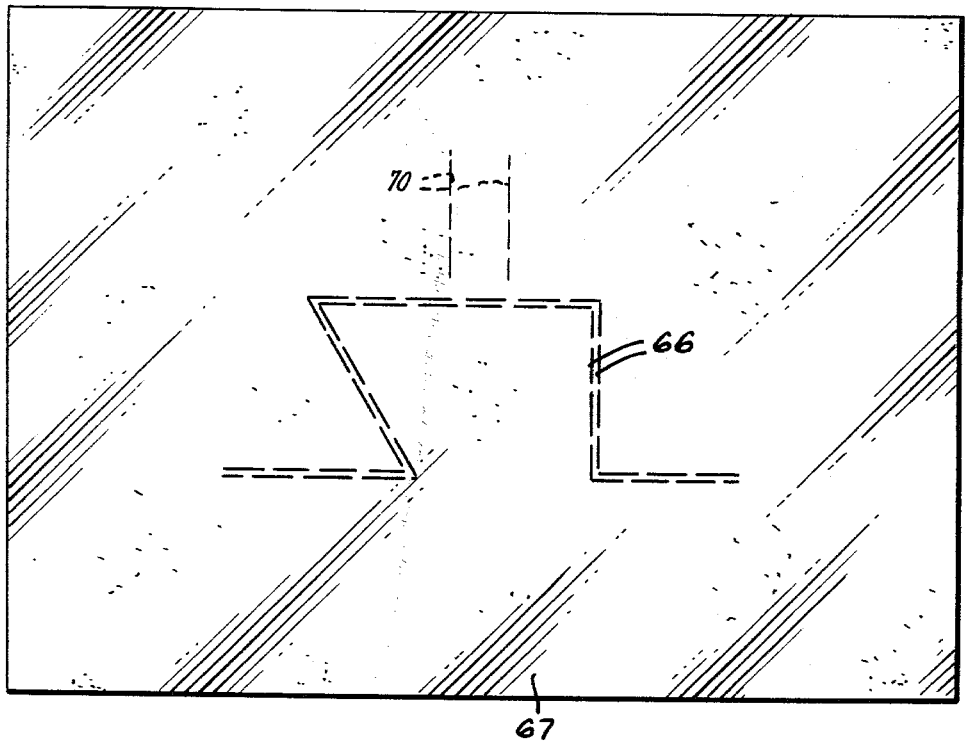
FIG. 8 is a suitable pattern for the optical comparator screen for use with the apparatus and the article to be tested as shown in FIG. 7.

The article 51 is arranged against a plate 61 and is clamped thereagainst by a spring-biased clamp 62 which may be identical to the clamp 22 of FIGS. 1 and 2. The plate 61 is suitably mounted on a base 63 which is in turn secured to a mounting (not shown) through thumb screws 65. Again, the mounting is adjustable vertically and from left to right as viewed in FIG. 7, such that the image of the projection 52 may be made to correspond to the corresponding pattern lines 66 on an associated screen 67. Since the article 51 is located on the fixture with its critical edge 53 against a pin 68 (see FIG. 7), the adjustment of the article 51 such that the image of its projection 52 corresponds with the pattern lines 66 on the screen 67 is accompanied by movement of the fixture to a single corresponding position. Accordingly, after the article 51 has been positioned such that the image of the projection 52 falls within the double lines 66, the location of the critical edge 53 with respect to the projection 52 may be tested by observation on the screen 67 of the image of an indicator 69 which is secured to the fixture. More specifically, the operator determines whether the image of the indicator 69 falls between pattern lines 70 on the screen.

In each of the two examples of application of the invention, two dimensions of an article are tested, one end of the larger dimension being common or closely related to the smaller dimension, and the larger dimension being several times the magnitude of the smaller whereby it cannot be displayed on the screen of the optical comparator simultaneously with a properly enlarged display of the smaller dimension. In each case, the article is arranged on a fixture with the remote or unrelated end of the larger dimension at a predetermined position with respect to a distinguishable point on the fixture which is closely adjacent the smaller dimension.

In the first example, the above-referred to remote end of the larger dimension is the opening 16, and the distinguishable point on the fixture is the aperture 45. In the second example, the remote end of the larger dimension is the critical edge 53 and the distinguishable point on the fixture is the indicator 69. In each case the "distinguishable point" is closely adjacent the smaller dimension such that its image may be projected on the screen simultaneously with the image of the smaller dimension, or at least without intermediate movement of the fixture. This serves to display on the screen simultaneously, or at least without movement of the fixture, both the image of the smaller dimension, and the image of a distinguishable point on the fixture whose position is a function of the position of the remote end of the larger dimension, and hence, of the magnitude of the larger dimension.

In each case, with the article thus related to the fixture, the fixture is moved with respect to the screen of the optical comparator such that the smaller dimension may be compared accurately with the corresponding pattern on the screen. This permits full use of the sensitivity and accuracy of the optical comparator. The value of the larger dimension is then tested by comparing the image of the distinguishable point on the fixture with a corresponding pattern on the screen.

In the first example, the article must be removed from the fixture before the distinguishable point on the fixture (the aperture 45) can have its image projected on the screen. The two images, namely, the image of the smaller dimension (the opening 12) and the image of the distinguishable point on the fixture (the aperture 45) are nevertheless brought within the prescribed pattern lines on the screen with the fixture in a single position. In this manner the desired effect is obtained even though no distinguishable point on the fixture is readily made visible on the screen when the article is in place, since the article conceals all adjacent portions of the fixture.

Through a modification of the examples of FIGS. 1–6, the distinguishable point on the fixture can be made observable even though the article covers these surrounding or adjacent areas of the fixture. This can be accomplished by providing cross hairs within the aperture 45. The image of these cross hairs would be projected on the screen by virtue of the light which passes through the opening 12. The lines 19 on the screen of FIG. 6 could then be replaced by four markings near the center of the circles 15 between which the cross hairs would be required to fall. By virtue of this modification, the position of the fixture, and hence the magnitude of the larger dimension, could be determined prior to removal of the article 11, and hence without the accompanying risk of movement of the fixture.

Where both the smaller dimension and the larger dimension are required to fall within substantially equally critical limits, it may be permissible and desirable to adjust the position of the fixture while observing both projected images such that the article under test may be found acceptable provided that the two images may be brought within the corresponding pattern lines. More specifically, the image of the smaller dimension might be moved to one extreme of its range of tolerance in order to make the image of the distinguishable point on the fixture fall within its range of tolerance.

In any of the illustrated or described applications of the invention, the fixture need be adjusted as to its position only once for each article tested. As each new article is arranged for testing, the fixture is moved, if necessary, to bring the image of the smaller dimension within the prescribed pattern on the screen. Without further adjustment of the fixture the image of the distinguishable point on the fixture is compared with the prescribed pattern on the screen, the testing of the article thereby being completed.

While various embodiments of the invention have been disclosed, many modifications will be apparent, and it is intended that the invention be interpreted as including all modifications which fall within the true spirit and scope of the invention.

What is claimed is:

1. The method of testing two dimensions of successive articles against a pattern displayed on the screen of an optical comparator, the two dimensions extending from at least related points and being of such relative magnitude that the remote or unrelated end of a larger dimension is incapable of display on the comparator screen simultaneously with the related end thereof when the smaller dimension is magnified to the extent desired for proper testing, which method comprises:

establishing a distinguishable reference point on a fixture for the remote end of the larger dimension, said distinguishable point being capable of effecting an image on the screen of the comparator;

mounting an article on the fixture with the remote end of the larger dimension at a predetermined position relative to the distinguishable point on the fixture, and with the smaller dimension closely adjacent to the distinguishable point;

projecting an image of the fixture and the article onto the screen of the comparator, the screen having separate tolerance patterns thereon corresponding to the smaller dimension and to the larger dimension as represented by the distinguishable point; and positioning the fixture on the comparator to locate the distinguishable point and the smaller dimension relative to the respective tolerance patterns on the screen to determine if the images of both the distinguishable point and the smaller dimension can be brought within the prescribed pattern lines with the fixtures in a single position.

2. The method of testing two dimensions of successive articles against a pattern displayed on the screen of an optical comparator, the two dimensions extending from at least related points and being of such relative magnitude that the remote or unrelated end of a larger dimension is incapable of display on the comparator screen simultaneously with the related end thereof when the smaller dimension is magnified to the extent desired for proper testing, which method comprises:

establishing a distinguishable reference point on a fixture for the remote end of the larger dimension, said distinguishable point being capable of effecting an image on the screen of the comparator;

mounting an article on the fixture with the remote end of the larger dimension at a predetermined position with respect to the distinguishable point on the fixture, and with the smaller dimension closely adjacent to the distinguishable point;

projecting an image of the fixture and the article onto the screen of the comparator, the screen having separate tolerance patterns thereon corresponding to the smaller dimension and to the larger dimension as represented by the distinguishable point; and positioning the fixture on the comparator to locate the smaller dimension relative to its tolerance pattern on the screen, to determine both whether the image of the smaller dimension can be brought within its prescribed tolerance lines and whether the image of the distinguishable point can be brought within its tolerance pattern, all with the fixture in a single position.

3. The method of testing two dimensions of successive articles against a pattern displayed on the screen of an optical comparator, one of the dimeisions relating to an aperture in the article spaced a substantial distance from the nearest edge of the article, the other dimension being the distance from the aperture to a remote point on the article incapable of display on the screen simultaneously with the aperture when the latter is magnified to the extent desired for proper testing, which method comprises arranging the article on a fixture with the remote point at a predetermined distance from an opening in the fixture, the opening being larger than the aperture, and the predetermined distance being such that the opening is substantially aligned with the aperture when the aperture is properly located in the article, projecting an image of the fixture and the article onto the screen of the comparator, the screen having spearate tolerance patterns thereon corresponding to the aperture in the article and to the reference opening in the fixture, locating the fixture with respect to the pattern on the screen to determine whether the image of the aperture can be brought within prescribed pattern lines, removing the article from the fixture without movement of the fixture, and noting whether the image of the opening falls within prescribed pattern lines.

References Cited by the Examiner
UNITED STATES PATENTS

| | | | |
|---|---|---|---|
| 2,737,080 | 3/56 | Mottu | 88—24 |
| 2,780,956 | 2/57 | Fuller et al. | 88—24 |
| 3,025,748 | 3/62 | Schoepe et al. | 88—24 X |

EVON C. BLUNK, *Primary Examiner.*

EMIL G. ANDERSON, NORTON ANSHER,
*Examiners.*